United States Patent [19]

Kuwamoto et al.

[11] Patent Number: 5,353,399
[45] Date of Patent: Oct. 4, 1994

[54] METHOD AND SYSTEM FOR SELECTING DEVICES IN INFORMATION NETWORKS, INCLUDING INPUTTING/OUTPUTTING DATA TO A SPECIFIED DEVICE SELECTED BY POINTING TO A CORRESPONDING INDICATOR ON A SCREEN

[75] Inventors: Hideki Kuwamoto; Tadashi Kuwabara; Keiichi Nakane, all of Yokohama; Masaki Fujiwara, Hitachi, all of Japan

[73] Assignee: Hitachi, Ltd., Tokyo, Japan

[21] Appl. No.: 608,392

[22] Filed: Nov. 2, 1990

[30] Foreign Application Priority Data

Nov. 8, 1989 [JP] Japan .................... 1-290424

[51] Int. Cl.$^5$ .................... G06F 13/00; G06F 15/62
[52] U.S. Cl. .................... 395/159; 395/155; 395/325; 395/800; 364/DIG. 1; 364/284; 364/284.2; 364/284.4; 364/286; 364/286.1; 364/264; 364/264.6
[58] Field of Search ................ 395/100, 155, 917, 934, 395/159, 156, 200, 325, 600, 700, 800; 364/514, 146, 188; 340/825.06, 825.07; 379/32-34

[56] References Cited

U.S. PATENT DOCUMENTS

| | | | |
|---|---|---|---|
| 4,275,449 | 6/1981 | Aish | 364/512 |
| 4,866,758 | 9/1989 | Heinzelmann | 379/94 |
| 4,939,507 | 7/1990 | Beard et al. | 340/706 |
| 4,942,540 | 7/1990 | Black et al. | 364/514 |
| 5,021,968 | 6/1991 | Ferketic | 364/505 |
| 5,049,873 | 9/1991 | Robins et al. | 340/825.06 |
| 5,055,996 | 10/1991 | Keslowitz | 364/188 |
| 5,061,916 | 10/1991 | French et al. | 340/522 |
| 5,101,425 | 3/1992 | Darland et al. | 379/34 |
| 5,117,372 | 5/1992 | Petty | 395/154 X |
| 5,155,822 | 10/1992 | Doyle et al. | 395/400 |
| 5,175,800 | 12/1992 | Galis et al. | 395/51 |
| 5,202,985 | 4/1993 | Goyal | 395/600 |
| 5,214,756 | 5/1993 | Franklin et al. | 395/159 |
| 5,226,120 | 7/1993 | Brown et al. | 395/200 |
| 5,261,044 | 11/1993 | Dev et al. | 395/159 |

OTHER PUBLICATIONS

Feridun, M. et al., "ANM: Automated Network Management System," IEEE Network, vol. 2 No. 2, Mar. 1988, pp. 13-19.

Introduction to MS Networks and Personal Computer LAN, Gijiyutu-Hyouron Company, pp. 80-85.

Ogawa, Takayasu, et al., "Wiring Management in a Large Scale Building," NEC Technical Journal, vol. 43 No. 6, 1990, pp. 100-104.

Hewlett-Packard Journal, Apr. 1990, pp. 51-84.

Reed, Paul, "Application of Cognitive Engineering to a Graphics-Based Interface for Effective Network Management Tools", Proceedings of Trends & Applications Utilizing Computer Graphics, 1985, IEEE Computer Society Press, p. 81.

Berman, R. K., "Customer Control and Management in a Multi-Controller Environment," Globecom '88, IEEE Global Telecommunications Conference and Exhibition-Communications for the Information Age, IEEE 1988, pp. 1525-1529.

Chang, L., et al., "A Network Status Monitoring System Using Personal Computer," Globecom '89, IEEE Global Telecommunications Conference and Exhibition-Communications Technology for the 1990s and Beyond, IEEE 1989, pp. 201-206.

*Primary Examiner*—Paul V. Kulik
*Attorney, Agent, or Firm*—Antonelli, Terry, Stout & Kraus

[57] ABSTRACT

A shared source managing method and device are provided for managing as shared sources a plurality of I/O devices by a plurality of information processing devices. The shared source managing method and device are designed to display a sketch of an inside of a building in which I/O devices are installed on the screen of each information processing device, display the design representing the I/O device at the installed location of each I/O device, and indicate the installed location of each I/O device to a user. Further, the method and device serve to display the type and the operating state of each I/O device together with the design of the I/O device so that the user can know the type and the operating state of each I/O device.

24 Claims, 14 Drawing Sheets

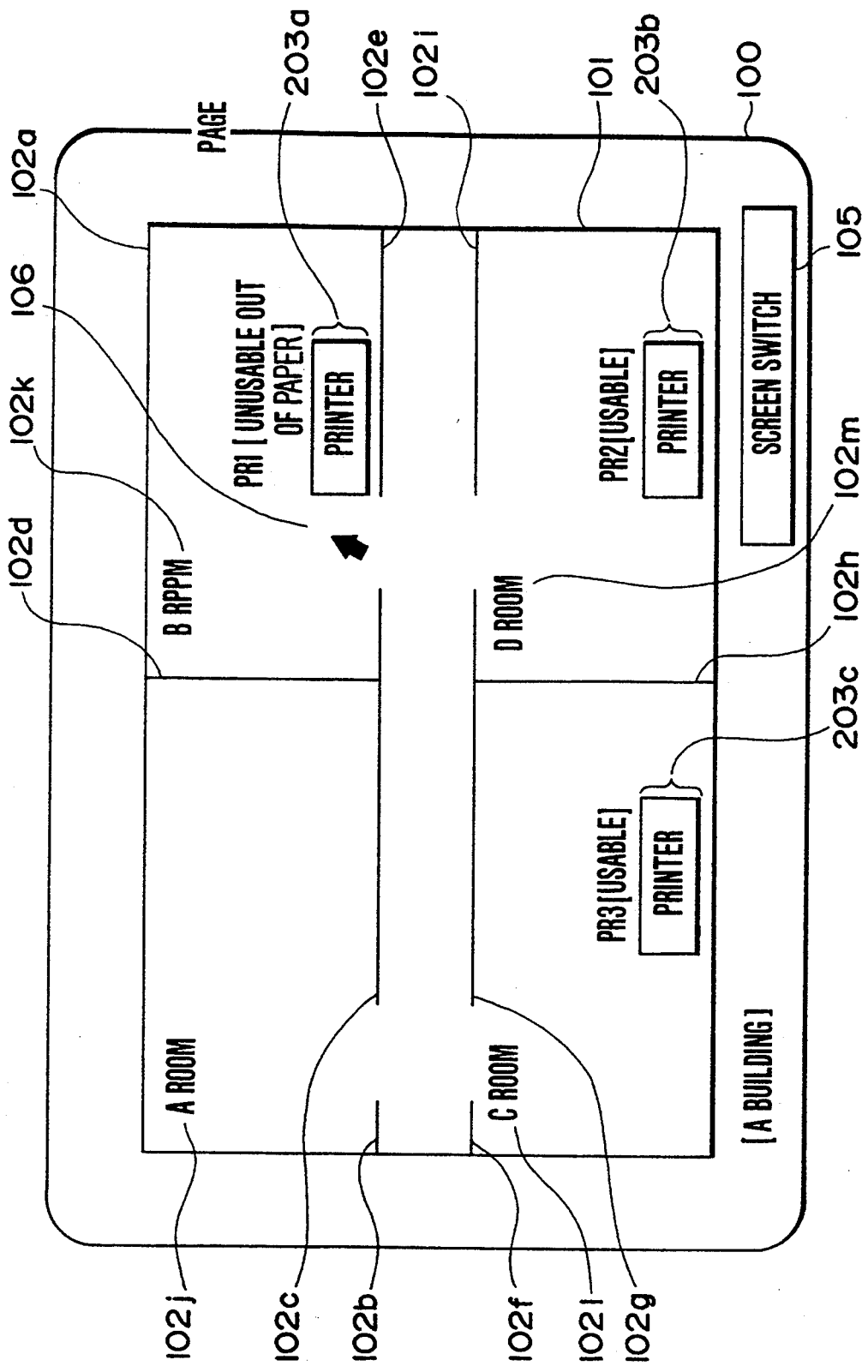

FIG. 5

| | 502 | 506 | 503 | 504 | 505a | 505b |
|---|---|---|---|---|---|---|
| 500 | | | | | | |
| 501a | PRINTER NAME | PRINTER TYPE | NETWORK ADDRESS | DATA NUMBER | X-COORDINATE VALUE | Y-COORDINATE VALUE |
| 501b | PRINTER NAME | PRINTER TYPE | NETWORK ADDRESS | DATA NUMBER | X-COORDINATE VALUE | Y-COORDINATE VALUE |
| 501c | PRINTER NAME | PRINTER TYPE | NETWORK ADDRESS | DATA NUMBER | X-COORDINATE VALUE | Y-COORDINATE VALUE |

FIG.13

| | DEVICE NAME 282 | DEVICE TYPE 286 | NETWORK ADDRESS 283 | DATA NUMBER 284 | X-COORDINATE VALUE 285a | Y-COORDINATE VALUE 285b | ICON DESIGN 287 |
|---|---|---|---|---|---|---|---|
| 281a | | | | | | | |
| 281b | ″ | ″ | ″ | ″ | ″ | ″ | ″ |
| 281c | ″ | ″ | ″ | ″ | ″ | ″ | ″ |
| 281d | ″ | ″ | ″ | ″ | ″ | ″ | ″ |
| 281e | ″ | ″ | ″ | ″ | ″ | ″ | ″ |
| 281f | ″ | ″ | ″ | ″ | ″ | ″ | ″ |
| 281g | ″ | ″ | ″ | ″ | ″ | ″ | ″ |
| 281l | ″ | ″ | | ″ | ″ | ″ | ″ |

280

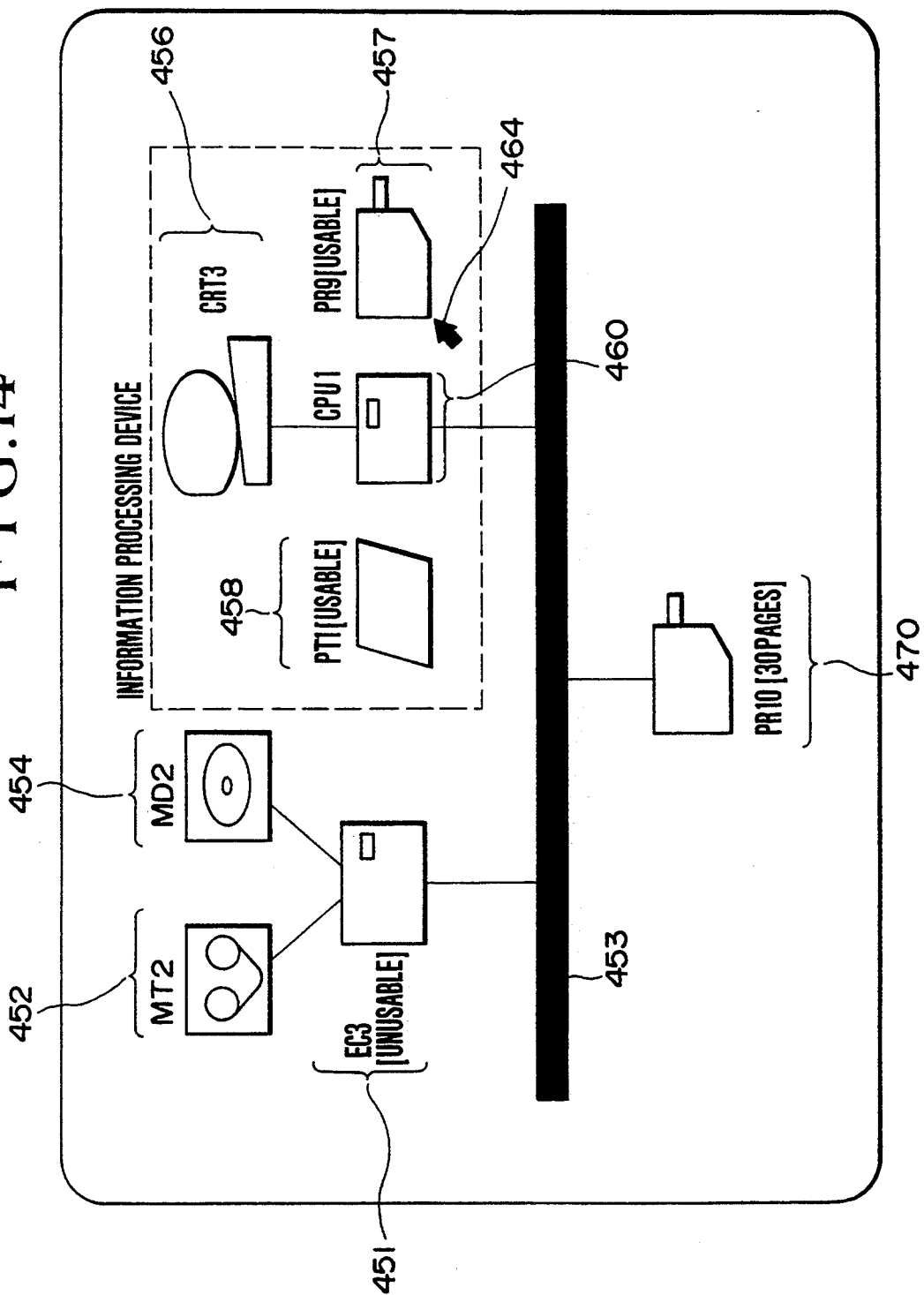

METHOD AND SYSTEM FOR SELECTING DEVICES IN INFORMATION NETWORKS, INCLUDING INPUTTING/OUTPUTTING DATA TO A SPECIFIED DEVICE SELECTED BY POINTING TO A CORRESPONDING INDICATOR ON A SCREEN

BACKGROUND OF THE INVENTION

The present invention relates to a method and device for managing shared sources in an information processing device connected to one or more I/O devices through a communication line. More particularly, the invention relates to a method and device for managing shared sources in the information processing device, which method and device are preferable provided that the information processing device is separated from the I/O device allowing information to be input to or output from the information processing device.

To input or output data at more than one I/O device provided in the information processing device through communication lines, a user is required to know the kinds and locations of the I/O devices.

One example of the information processing device having a plurality of I/O devices connected thereto is described on page 84 of "Introduction to MS-NETWORKS and Personal Computer LAN" published in Gijiyutu-Hyouron (Technique critique) Company Edition. According to this publication, a user takes the steps of specifying a title of an object I/O device for indicating an input or output to the I/O device or displaying a list of I/O devices connected to the information processing device for referring to each title of the I/O devices.

An example of a network management system is described in "ANM" Automated Network Management System", IEEE Network, Vol. 2, No. 2, March 1988, pp. 13–19. This system is designed to graphically display how the devices are connected by referring to the connecting state of those devices.

The foregoing prior arts have the following disadvantages.

If a person uses an information processing device having a plurality of I/O devices connected through communication lines, the user often wants to know where each I/O device is located. In particular, the user is anxious to know the location of each data-outputting device, such as a printer or plotter, or each data-inputting device, such as a card reader. One reason for knowing the location is that if the I/O device located near the user malfunctions or outputs a great deal of data, another I/O device is required. Another reason is that it may be necessary to make sure if a rarely-used special I/O device is connected to the system and know the location of the I/O device. In these instances, the prior art has been designed to display the list of each I/O device connected to the information processing device and to allow the user to suppose the location of each I/O device based on the title of each I/O device indicated in the list.

The foregoing "ATM" Automated Network Management System" discloses the technique of graphically displaying on a CRT how the I/O or other devices are connected in a LAN system. This technique, however, cannot provide information about the location of each I/O device to a user.

As is understood from the above, the foregoing prior art has disadvantages in that it is difficult for a user to positively and easily know each location of I/O devices connected to the information processing device.

SUMMARY OF THE INVENTION

It is an object of the present invention to provide a method and device for managing shared sources in an information processing device having a plurality of I/O devices connected through communication lines or the like, in which the method and device allow a user to positively and easily locate shared sources such as I/O devices or processors.

It is a further object of the present invention to provide a method and device for managing shared sources in an information processing device having a plurality of I/O devices connected through communication lines or the like, in which the method and device allow a user to discern the type and the operating state of each I/O device.

It is a still further object of the present invention to provide a method and device for managing shared sources in an information processing device having a plurality of I/O devices connected through communication lines or the like, in which the method and device allow a user to immediately attribute an input or output to an object I/O device.

It is another object of the present invention to provide a method and device for managing shared sources in an information processing device having a plurality of I/O devices connected through communication lines or the like, in which the method and device allow a user to easily discern which I/O device is being used on its basis of the location, the type and the operating state of each I/O device and immediately select a proper I/O device and attribute an input or output thereto.

To achieve the foregoing objects, according to a first aspect of the invention, the method for managing shared sources, designed to manage a plurality of I/O devices as shared sources in a plurality of information processing devices, comprises the process of displaying on the screens of the information processing devices a sketch representing a building within which the I/O devices are installed as well as a design and a character string representing the I/O device at the installed location of each I/O device inside of the sketch, for the purpose of allowing a user to locate the installation of each I/O device.

According to a second aspect of the invention, the method for managing shared sources in an information processing device, designed to manage a plurality of I/O devices and peripheral devices as shared sources in a plurality of information processing devices, comprises the process of displaying on the screens of the information processing devices a sketch representing a building within which the I/O devices and peripheral devices are installed as well as a design and a character string representing the devices at the installed location of each device inside of the sketch, for the purpose of allowing a user to locate each device.

According to a third aspect of the invention, the method for managing shared sources, designed to manage a plurality of I/O devices as shared sources in a plurality of information processing devices, comprises the process of graphically displaying on the screens of the information processing devices the connection state of the I/O devices to be used as well as the design representing each I/O device together with the current operating state of each I/O device.

According to a fourth aspect of the invention, the method for managing shared sources, designed to manage a plurality of I/O devices and peripheral devices as shared sources in a plurality of information processing devices, comprises the process of, when using the information processing devices and the I/O devices, graphically displaying on the screens of the information processing devices the connection state of the information processing devices, the I/O devices, and the peripheral devices and the design representing each device together with the current operating state of each device.

According to a fifth aspect of the invention, the method for managing shared sources, designed to manage a plurality of information processing devices and I/O devices as shared sources in the information processing devices, comprises the steps of drawing a sketch representing the inside of a building in which the shared sources are installed on the basis of the drawing data stored in a sketch information file, drawing the designs representing the shared sources at the installed locations of these sources inside of the sketch on the basis of the data stored in a shared source attribute information file, and displaying the current operating state of each shared source accompanied with each corresponding design.

According to the sixth aspect of the invention, the device for managing shared sources for information processing, designed to connect a plurality of information processing devices each having a central processing unit, a display unit and a storage unit, and a plurality of I/O devices shared by the information processing units through a communication network, comprises a sketch information file storing the drawing data about a sketch drawing a building in which the I/O devices are installed, an I/O device attribute information file in which at least the kind and the installed location of each I/O device are described, both files being provided in the storage unit, and a display means for displaying the sketch on which the inside of a building is drawn and a design representing each I/O device at its respective installed location within the sketch on the screen of the display unit on the basis of the sketch information file and the I/O device attribute information file.

When one information processing device uses a specific I/O device served as a shared source, the method and device for managing shared sources for information processing is designed to allow the display-indicating means to indicate the display of the installed location, the type and the operating state of each I/O device to the information processing device. In response to the indication, the information processing device sends a message inquiring the operating state to each I/O device with a communication means provided in the information processing device. In response to the message, each I/O device sends a message notifying the information processing device of the operating state of the I/O device with a communication means provided in the I/O device. Then, the information processing device acquires the operating state of each I/O device from the message.

Next, the information processing device activates the display means to display on the display unit the drawing data stored in the sketch information file and a design representing the type and the operating state of each I/O device at the installed location of the I/O device in an overlapping manner with the drawing data. Then, an I/O device is selected by using the I/O device selecting means, the I/O means performs the I/O operation of the I/O device.

As described above, the information processing device having a plurality of I/O devices connected through communication lines or the like is designed to display a design representing each I/O device on a sketch illustrating the inside of a building for indicating the installed location of each I/O device. It allows in allowing a user to positively and easily locate each I/O device.

As another displaying method, there is provided a means of graphically displaying the connection state of the information processing device and a plurality of peripheral devices like I/O devices. It also allows a user to easily discern the connecting state of the peripheral devices.

And, the information processing device is also designed to display the type and the operating state of each I/O device and allow the design of each I/O device displayed on the display unit to be pointed for indicating an input or output to the I/O device. It results in allowing a user to easily decide which I/O device should be used on the basis of the installed location, the type and the operating state of each I/O device and immediately selecting the I/O device and indicating an I/O operation.

BRIEF DESCRIPTION OF THE DRAWINGS

These and other objects and advantages of the present invention will become apparent by reference to the following description and accompanying drawings wherein:

FIGS. 1A and 1B are views showing a screen on which shared printers are selected when the invention is applied to the shared printer;

FIG. 5 is a view illustrating the structure of a shared printer attribute file according to the first embodiment;

FIG. 13 is a view illustrating the structure of a shared source attribute file according to the second embodiment; and FIG. 14 is a view showing a screen on which the connecting state of other shared sources is graphically displayed according to the second embodiment.

DESCRIPTION OF THE PREFERRED EMBODIMENTS

Hereinafter, the embodiments of the present invention will be described with reference to the drawings.

First Embodiment

The first embodiment is designed so that the present invention is applied to a system having documentation workstations and shared printers connected in a LAN (Local Area Network).

Figure 2:
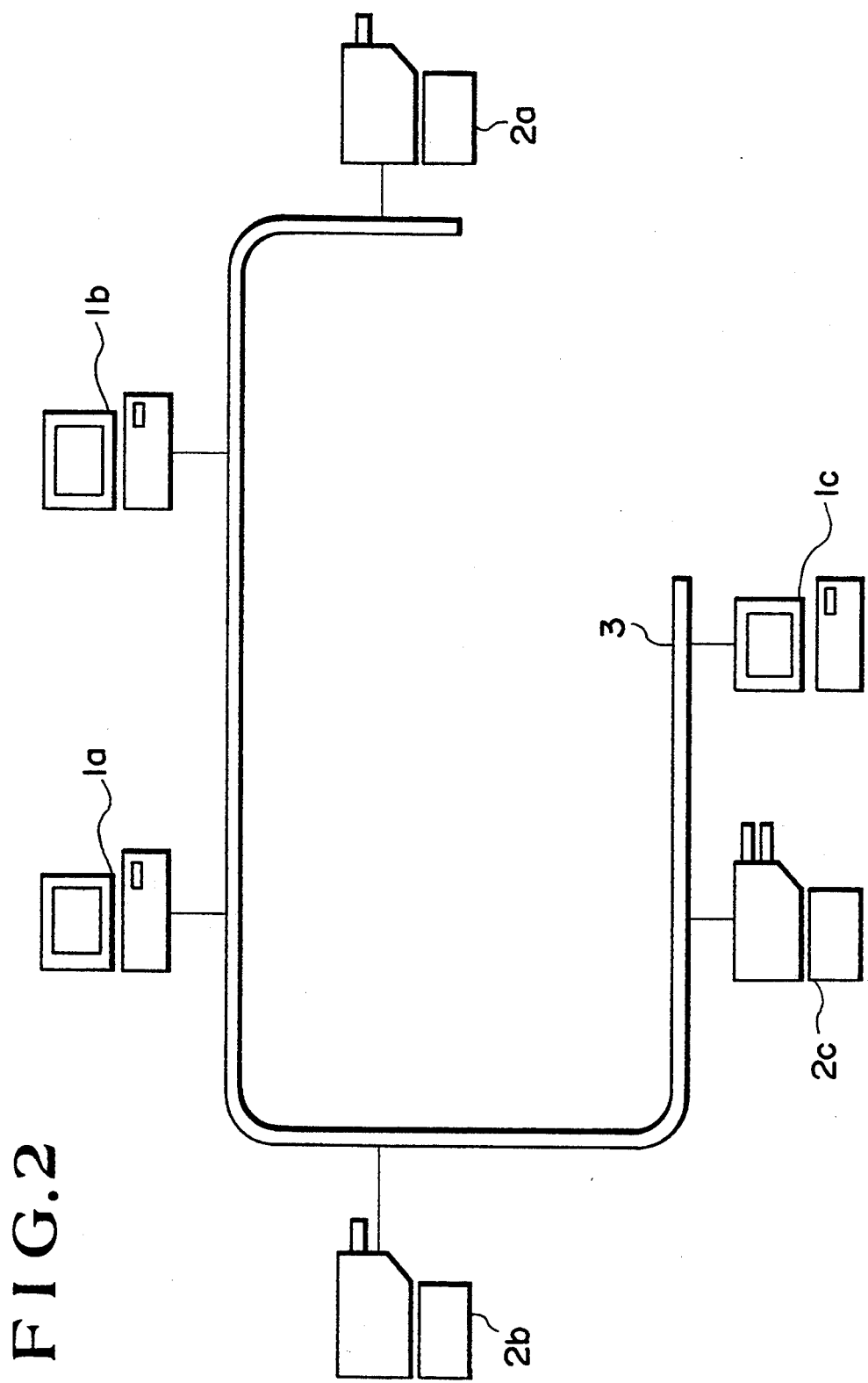
FIG. 2 is a view showing connection of documentation workstations and the shared printers according to a first embodiment.

First, FIG. 2 shows the connection state of the documentation workstations and the shared printers. 1a to 1c denote the documentation workstations, 2a to 2c denote shared printers. The documentation workstations 1a to 1c and the shared printers 2a to 2c are connected in the LAN 3 so that the documents created in the documentation workstations 1a to 1c can be printed by any one of the shared printer 2a to 2c.

Figure 3:
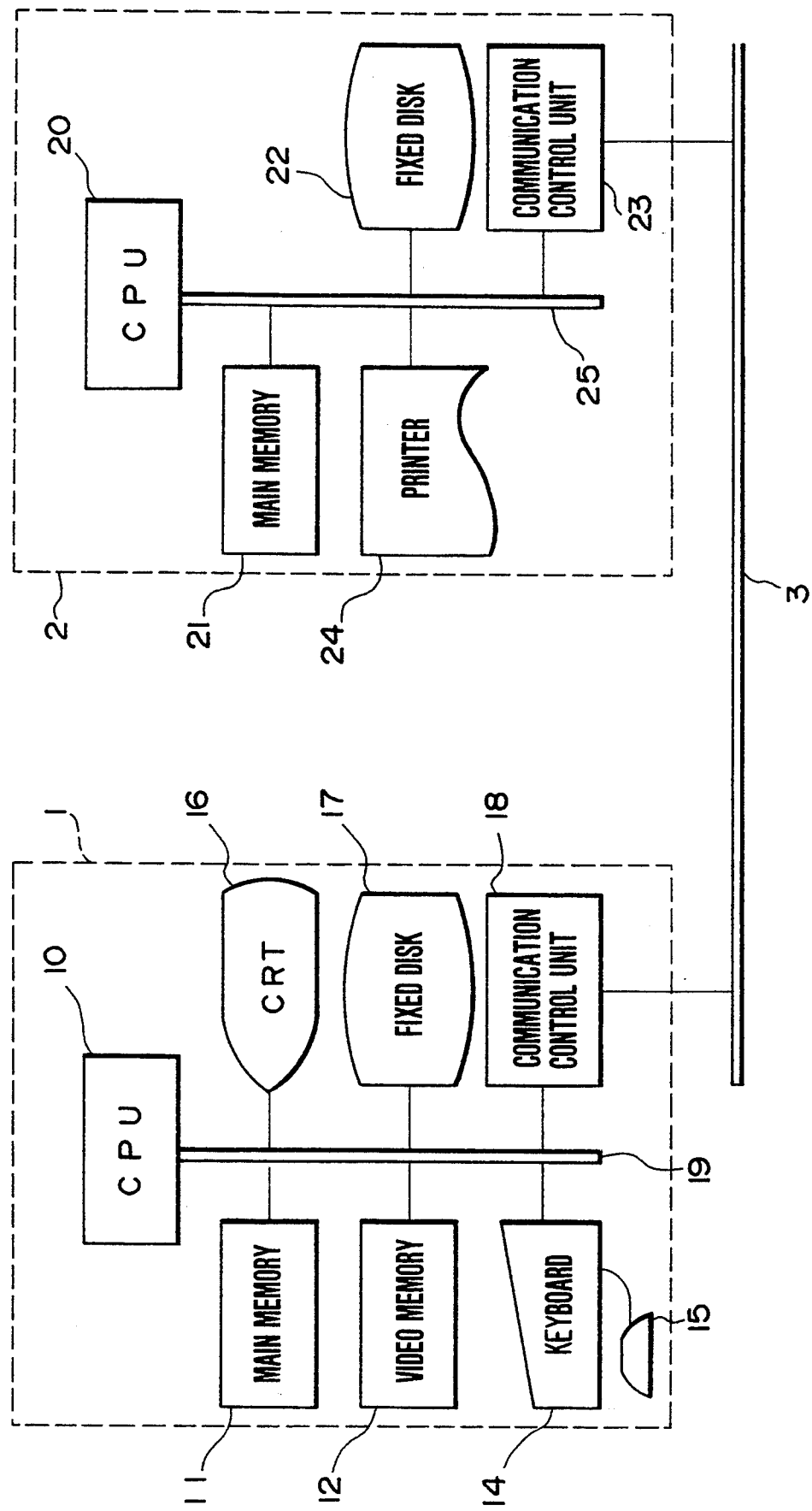
FIG. 3 is a hardware diagram showing the documentation workstations and the shared printers according to the first embodiment.

FIG. 3 shows a hardware arrangement including the documentation workstations 1a to 1c and the shared printers 2a to 2c shown in FIG. 2.

First, the hardware arrangement of the documentation workstation 1 (1a to 1c are generically referred to as 1 and this rule holds true for the other reference numbers) will be described. 10 denotes a central processing unit (CPU), which executes various programs for the creation of a document or the selection of the shared printers 2a to 2c for printing the document and further controls peripheral devices. 11 denotes a main memory, which stores programs and data for the creation of a document or the selection of the shared printers 2a to 2c. 12 denotes a video memory, which stores the data to be displayed on a display unit (CRT) 16. A user can give commands for editing a document or the selection of the shared printers with a keyboard 14 or a mouse 15. The display unit 16 serves to display the screen for the creation of a document or the screen for printing by the shared printer. 17 is a fixed disk, which reads or stores the programs and document data for the creation of a document, a sketch information file 400 or a shared printer attribute file 500 (to be described later). 18 denotes a communication control unit, which communicates with the shared printers 2a to 2c through the LAN 3. 19 denotes a bus through which the data is transferred between these peripheral devices 11 to 18 and the central processing unit 10.

Next, the description will be directed to the hardware arrangement of the shared printer 2 shown in FIG. 2. As stated above, 20 denotes a central processing unit, which executes various programs for printing and further controls the peripheral devices. 21 denotes a main memory, which stores the program and data for printing. 22 denotes a fixed disk, which reads and stores the programs and the document data for printing. 23 denotes a communication control unit, which communicates with documentation workstations 1a to 1c through the LAN 3. 24 denotes a printer (PRT) which prints a document. 25 denotes a bus through which data is transferred between the peripheral devices 21 to 24 and the central processing unit 20.

Next, the sketch information file, the shared printer attribute file and the screen for the selection of the shared printer will be described with reference to FIGS. 4, 5, 1A, 1B and 8.

Figure 1A:
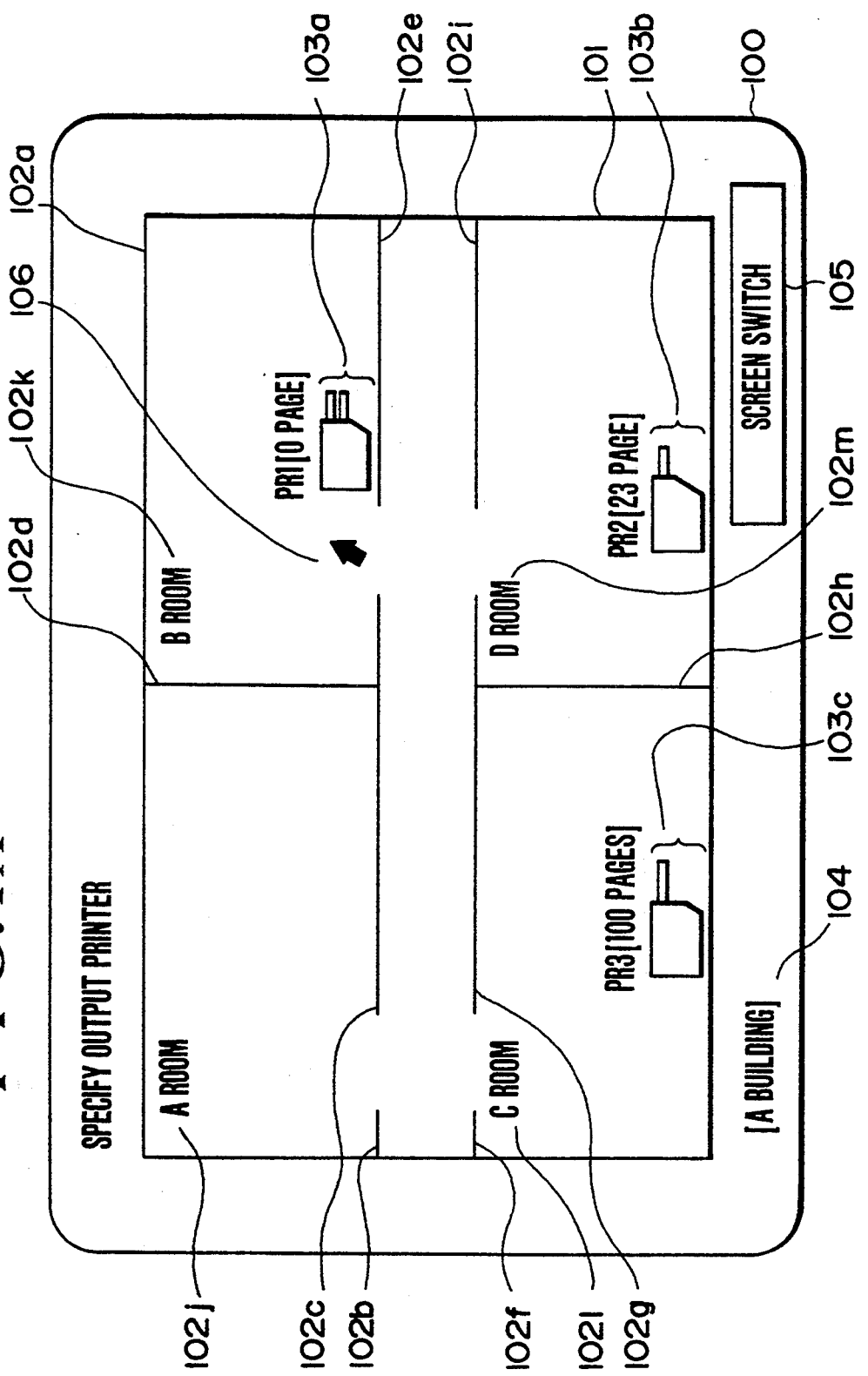
Figure 4:
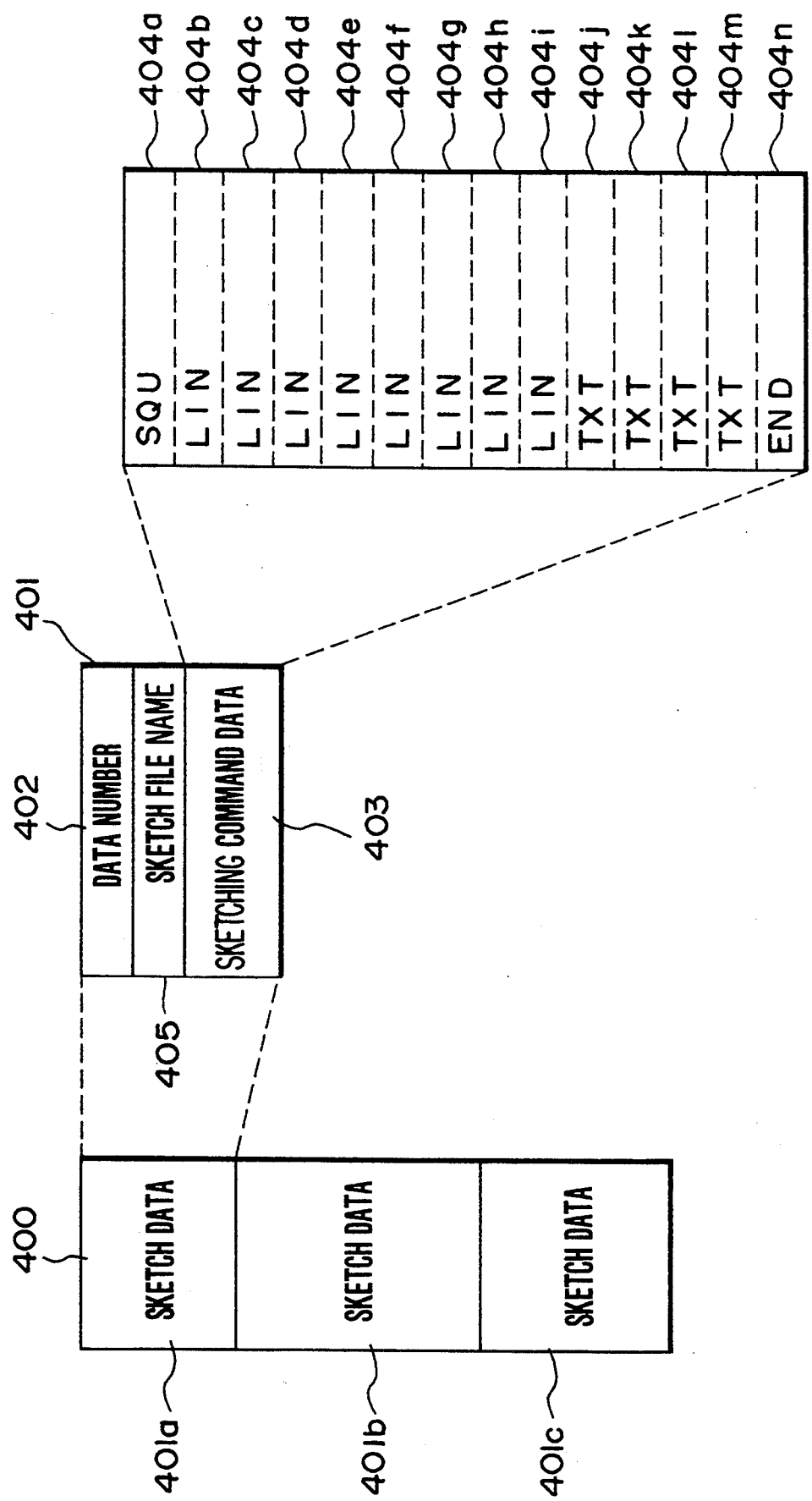
FIG. 4 is a view illustrating the structure of a sketch information file according to the first embodiment.
Figure 8:
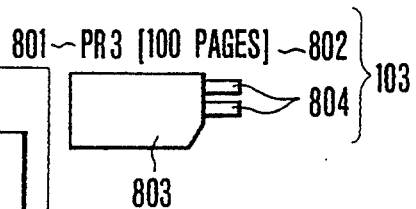
FIG. 8 is a view showing a printer icon according to the first embodiment.

FIG. 4 shows the structure of the sketch information file, FIG. 5 shows the structure of the shared printer attribute file, FIGS. 1A and 1B show examples of the screens for the selection of a shared printer, which are displayed on the display unit 16. FIG. 8 is a view illustrating a printer icon displayed on the screen for the selection of a shared printer.

Figure 9:
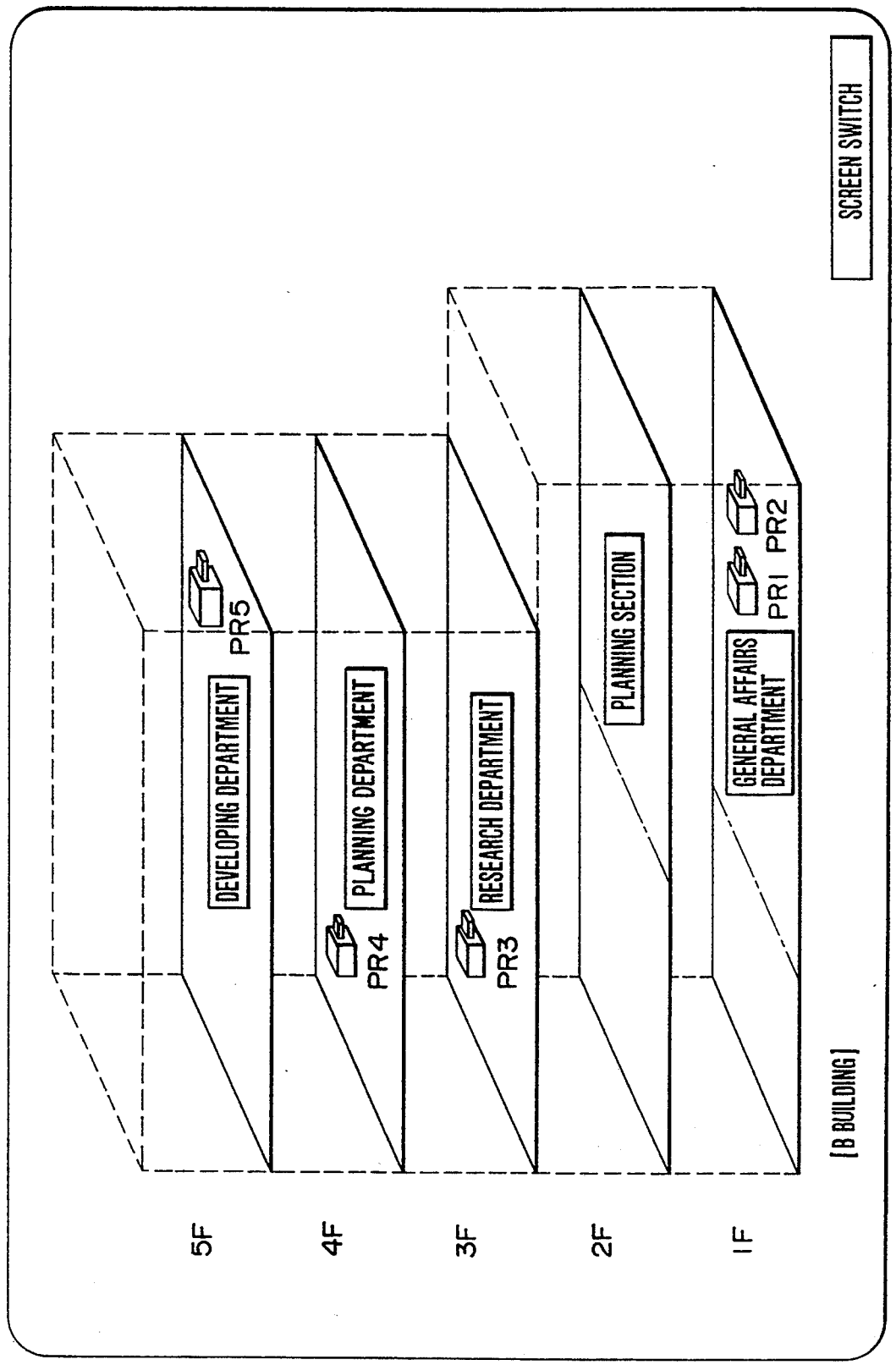
FIG. 9 is a view showing another screen on which the shared printer is selected.

The sketch information file 400 shown in FIG. 4 includes several pieces of sketch information data 401a to 401c. Each sketch information data consists of a data number 402, a sketch name 405 and sketching command data 403. The data number 402 is a number by which the sketch information data 401a to 401c are uniquely specified. The sketch name 405 has the name of a sketch represented by the sketch information data. The sketching command data 403 consists of a plurality of sketching commands 404a to 404n. Each sketching command 404a to 404m corresponds to each of the elements 102a to 102m displayed on the screen 100 for the shared printer selection shown in FIGS. 1A and 1B. These elements are components of a floor planar view 101. The sketch representing the inside of a building shown in FIGS. 1A and 1B are planar views for each floor, but the sketch may employ a screen on which the whole building or additional floors included in the building are represented three-dimensionally as shown in FIG. 9. Further, in FIGS. 1A, 1B and 9, the sketch of the inside of the buildings are represented, however, if possible to represent not only the inside but also the outside so as to represent the entire building site.

The shared printer attribute file 500 shown in FIG. 5 includes attribute data 501a to 501c which respectively correspond to the shared printers 2a to 2c connected through the LAN 3 shown in FIG. 2. Each of the attribute data 501a to 501c consists of a printer name 502, a printer type 506, a network address 503, a data number 504, and installed location coordinates 505a, 505b. The printer name 502 is a name given to each of the shared printers 2a to 2c. The printer type 506 indicates whether the shared printer is a two-stage cassette type printer or not or whether the used printing sheet is a continuous form or a single one. The network address 503 is an address by which a unique printer is specified in the LAN 3 having the shared printers 2a to 2c connected thereto. The data number 504 corresponds to the data number 402 of the sketch information data 401a to 401c indicating each installed location of the printers 2a to 2c as shown in FIG. 4. The installed location coordinates 505a, 505b correspond to the locations of the printer icons 103a to 103c representing the shared printers 2a to 2c on the floor planar view 101 shown in FIGS. 1A and 1B.

The printer icon 103 consists of a printer name 801, a print-waiting page number 802 and an icon mark 803 as shown in FIG. 8. The printer name 801 corresponds to the printer name 501 of the shared printer attribute file 500. The print-waiting page number 802 indicates the number of pages of a document waiting to be printed. The icon mark 803 corresponds to the printer type 506 of the shared printer attribute file 500. If the shared printer employs a two-stage sheet cassette, two cassette marks 804 are displayed. If it employs a one-stage sheet cassette, one cassette mark 804 is displayed. If the printer icon 103 is lit at half brightness, several problems are likely such as the printer being out of paper, out of toner, or having the power-off thereby causing the corresponding shared printer 2 to fail. As an alternative means, it is possible to display on or near the icon a character string of "POWER OFF", for example.

And, for recognizing whether or not the shared printer 2 is in operation, it is possible to count the number of pages of the document waiting to be printed. As another indicating means, the printer icon may be caused to be lit on and off. Further, the icons for the usable printers may be lit on and off. Further still, if the shared printer is a color printer with some color toners, the icon color may indicate the currently-usable color or, with respect to a color plotter, the icon may indicate the number or color of color pens currently mounted to the color plotter.

Moreover, as shown in FIG. 1A, the screen may have an icon located for indicating the location of each printer and be lit on and off or at half brightness for indicating whether each printer is usable, while as shown in FIG. 1B, the screen may have a character string provided for indicating the location of each printer and character strings (usable/unusable) provided for indicating whether the printer is usable.

The shared-printer-selecting screens 100 shown in FIGS. 1A and 1B indicate the type, the installed location and the operating state of each of the shared printers 2a to 2c on each floor of the building. As shown in FIGS. 1A and 1B, 105 denotes a screen switch for indicating the operation by which a different sketch from the displayed sketch 101 is to be displayed. 106 denotes a mouse cursor to be moved by a mouse 15. The mouse cursor 106 is used for indicating the printer icons 103a to 103c, the screen switch 105, and the like.

Figure 6:
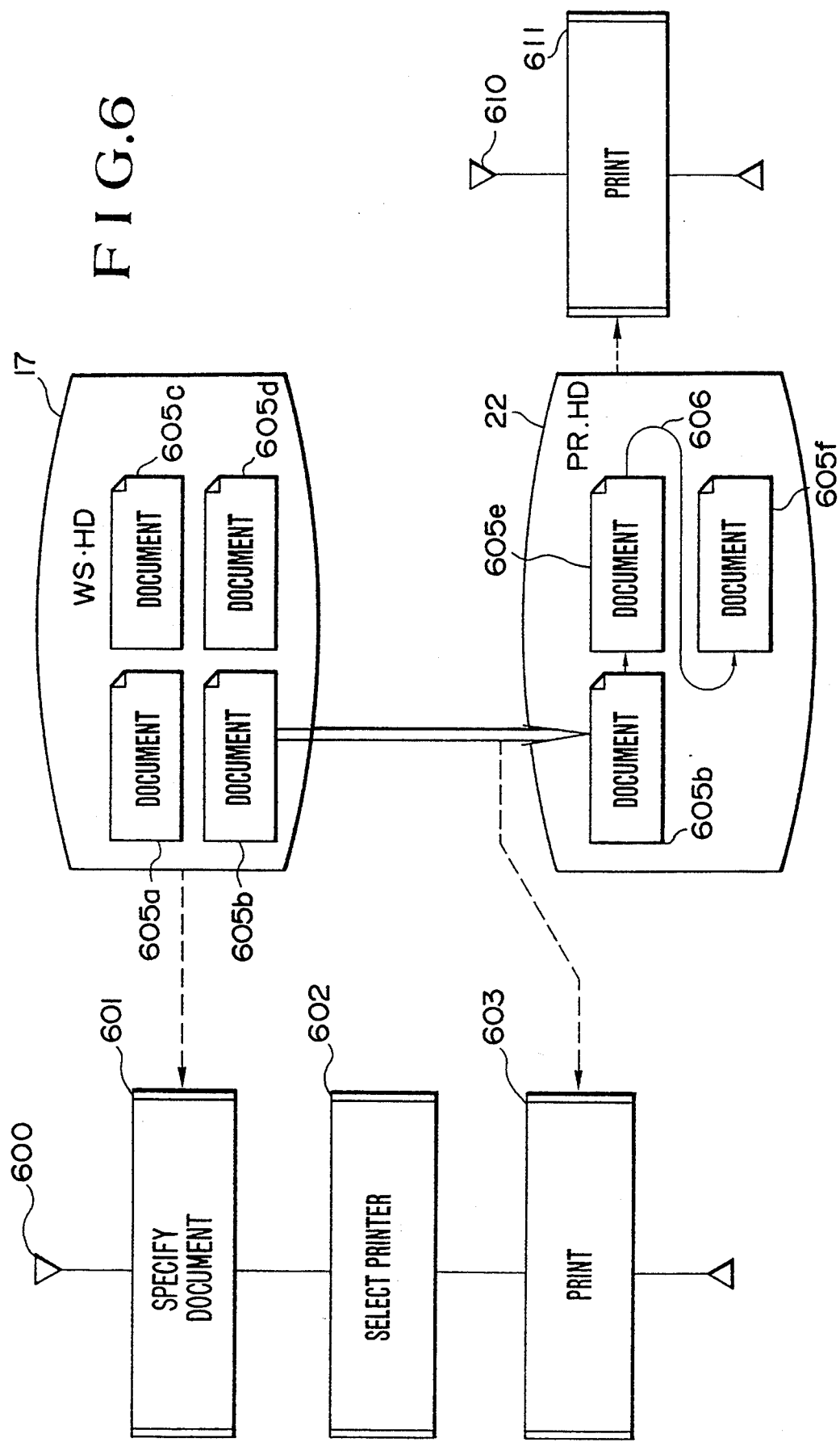
FIG. 6 is a diagram schematically showing how to print documents created in the documentation workstations with the shared printers according to the first embodiment.

Next, with reference to FIG. 6, the description will be directed to the summary of how to print a document in a system having the documentation workstations 1a to 1c and the shared printers 2a to 2c as described above. 600 denotes the printing process performed on the side of the documentation workstations 1a to 1c and 610 denotes the printing process performed on the side of the shared printers 2a to 2c.

First, at a document-specifying process 601, a user specifies any one of document data 605a to 605d stored in the fixed disk 17 of the documentation workstation 1. Then, at a printer-selecting process 602, the user specifies any one of the shared printers 2a to 2c for printing the document data 605b selected at the document-selecting process 601. And, at a printing process 603, the document data 605b selected at the document-specifying process 601 is sent to the shared printer 2 selected at the printer-selecting process 602. At a printing process 611 performed on the shared printer 2 selected at the printer-selecting process 602, the received document data 605b is connected to a printing queue 606 included in the shared printer 2. The printing queue 606 connected to the document data 605b to 605f waiting for being printed is stored in the fixed disk 22. The document data 605b to 605f waiting to be printed are read out in the sequence chained in the printing queue 606 and then are printed in the printer 24.

Figure 7:
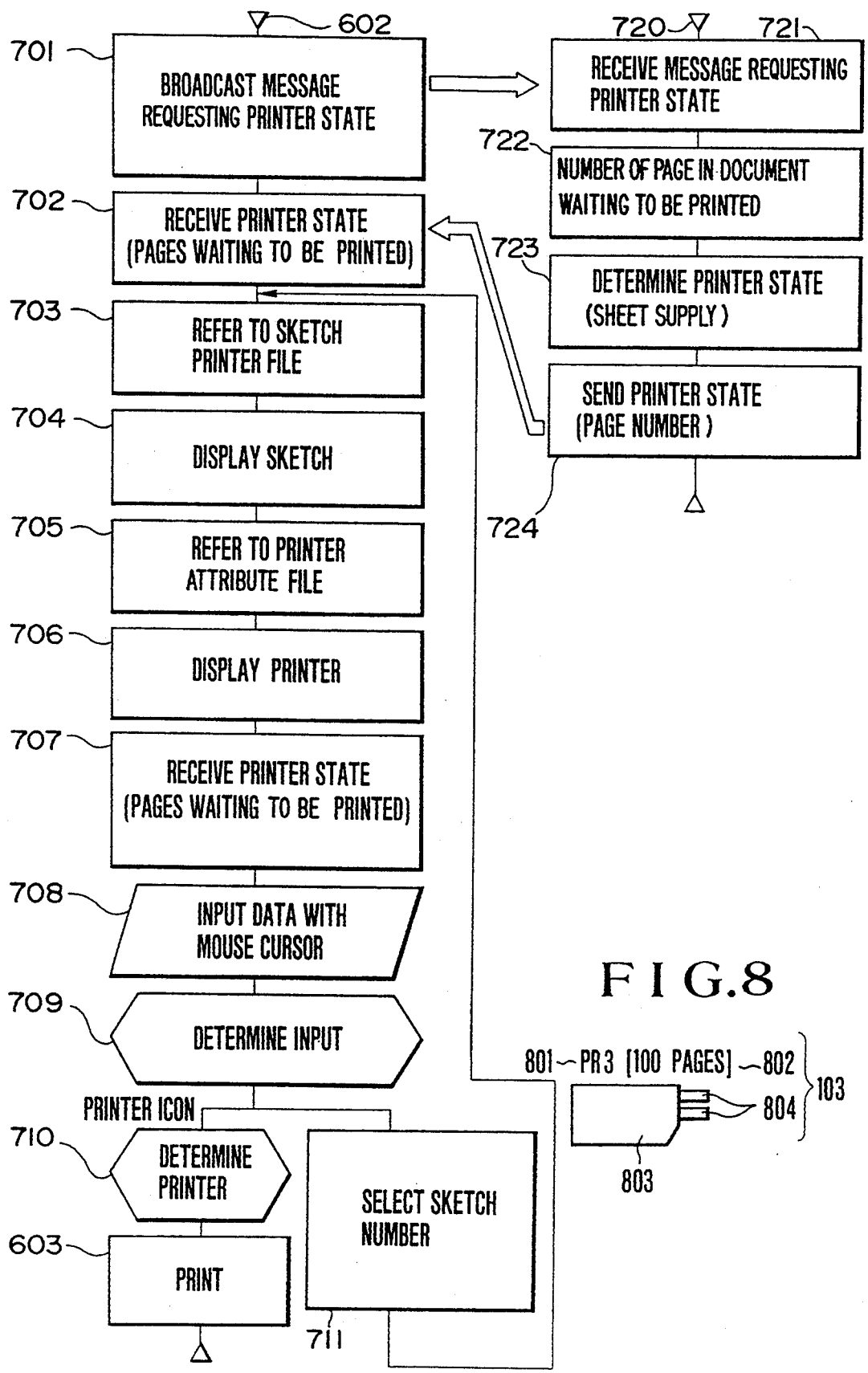
FIG. 7 is a flowchart showing how to select the shared printer according to the first embodiment.

Then, the printer-selecting process 602 will be detailed with reference to FIG. 7. 602 denotes the process performed on the side of the documentation workstations 1a to 1c. 720 denotes the process performed on the side of the shared printers 2a to 2c. The documentation workstation 1 sends a printer state inquiry message for requesting all of the pages of the document data waiting to be printed to all the printers 2a to 2c connected through the LAN 3 (701). At step 721, the shared printer 2 receives the message and then calculates the number of the pages of document data 605b to 605f chained to the printing queue 606 stored in the fixed disk 22 (722). Then, the printer 2 determines whether or not the sheet supply is out or not or whether the toner is out or not (723). In succession, the total pages calculated at the step 722 and the operating state determined at the step 723 are sent to the documentation workstation 1 which issued the printer state inquiry message (724). The documentation workstation 1 receives all the pages waiting to be printed and the operating state of each shared printer 2a to 2c (702). Then, the workstation 1 refers to the sketch information file 400 shown in FIG. 4 (703). Based on the sketch commands 404a to 404m, the elements 102a to 102m are displayed on the screen 101 as shown in FIG. 1. Based on the sketch name 405, the sketch name 104 is displayed. At a time, the screen switch 105 is displayed (704). Then, the documentation workstation 1 refers to the shared printer attribute file 500 shown in FIG. 5 (705) and displays the printer icons 103a to 103c of the shared printers 2a to 2c matching to the data number 504 on the screen 101 currently being displayed (706). The design data for the printer icon can be included in a program for indicating the icons or be prepared in the icon data file. Next, the workstation 1 serves to display the number of the pages of the documents waiting to be printed on the portion 802 of the printer icons 103a to 103c (707). If the workstation 1 recognizes the unusable shared printer 2 that is out of paper or out of toner based on the operating state response received at the step 702, it serves to display the corresponding printer icon 103 at half brightness or light alternately the printer icon 103 on and off to indicate that the printer is in use. If a user points to any one of the printer icons 103a to 103c with the mouse cursor 106 (708), the workstation 1 invokes a printer-determining process 710 at which it determines which one of the shared printers 2a to 2c is pointed to. And, invoking the printing process 603, the document data 605b selected by the printing document specifying process 601 is transferred to the shared printer 2 corresponding to the pointed printer icon 103 for printing the data 605b.

If the screen switch 105 is pointed to at the pointing process 708, a user points to another data number 402 at the sketch number selecting process 711 for displaying the sketch information data 401 for the plane view of another floor.

According to this embodiment, at the printer-selecting process 602, the workstation 1 serves to display the planar view 101 of the building on the display unit 16 and the printer icons 103a to 103c on the planar view 101 for the purpose of indicating the installed location, the type and the operating state of each shared printer 2a to 2c and the total pages of the document data waiting to be printed. If any one of the printer icons 103a to 103c is directly pointed to by the mouse cursor 106, the shared printer 2 corresponding to the printer icon 103 prints the document. By displaying the printer icons 103a to 103c on the planar view 101 of the building to indicate the installed locations of the shared printers, the user can easily and positively locate the shared printers 2a to 2c. Further, by displaying the printer icon 103 containing the type and the operating state of each shared printer 2a to 2c and the total number of pages of the queuing document, the user can immediately know which of the shared printers 2a to 2c is not in use. Further, by pointing to the usable one of the printer icons 103a to 103c, the user can indicate that the shared printer 2 corresponding to the printer icon 103 is immediately available to print the document.

According to the present embodiment, the total number of pages of the queuing document is displayed with the printer icon. Together with or instead of the display, it is possible to display the approximate printing completion time, which can be calculated by the CPU 20 based on the printing speed of the printer, the queuing pages and the document type.

Figure 10:
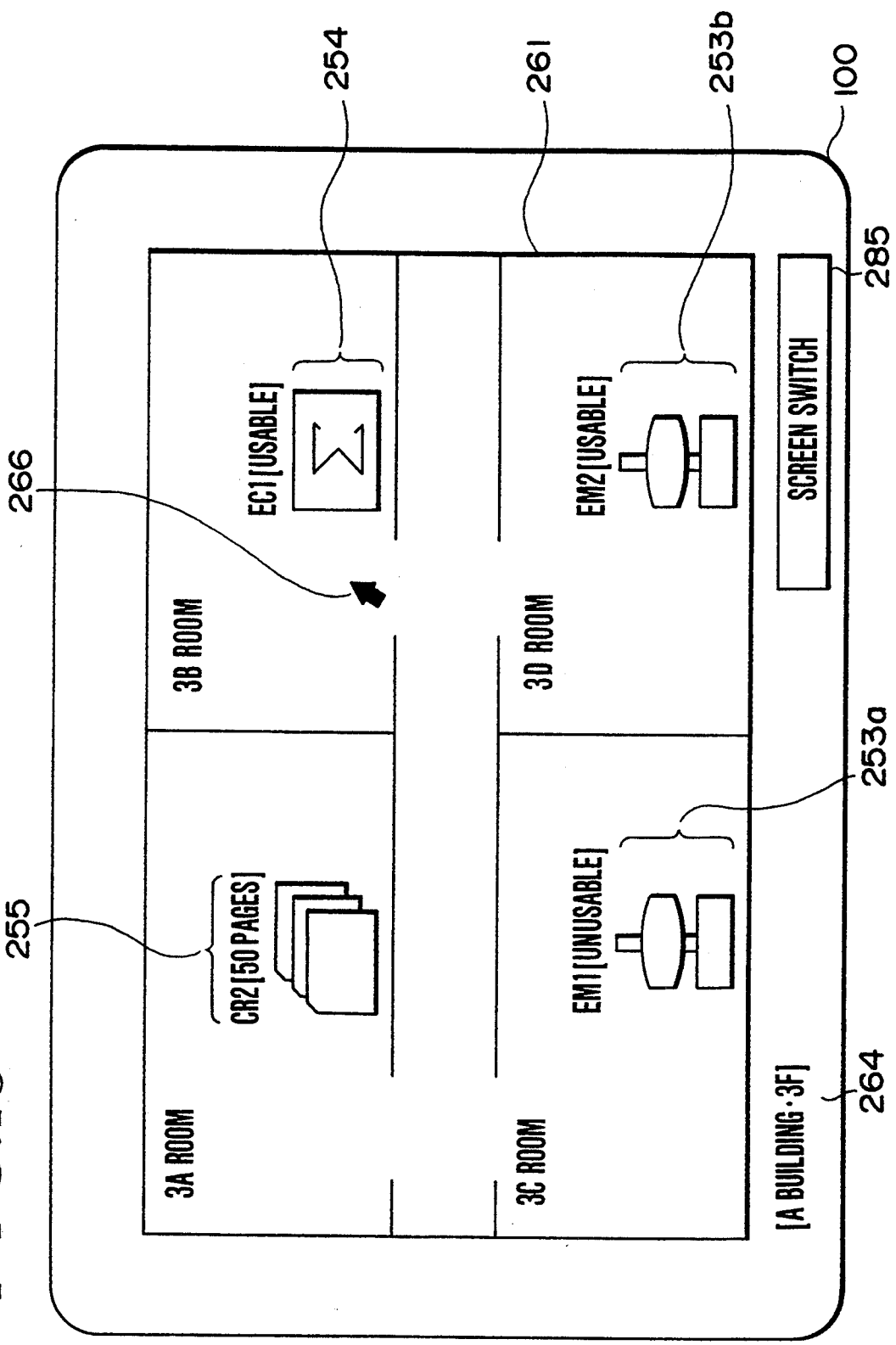
FIG. 10 is a view showing a screen on which the present invention is applied to I/O terminals or the like connected in a LAN.

Next, the description will be directed to the arrangement where the foregoing embodiment is applied not only to the management of the shared printers but also the shared sources such as other input devices, output devices and peripheral devices with reference to FIG. 10.

The workstation used in the present embodiment has the same structure as the workstation described with respect to FIG. 3 and the same sketch information file representing the floor planar view of a building as that described with respect to FIG. 4. Further, the shared source attribute file included in the present workstation has substantially the same structure as that described with respect to FIG. 5. This file contains attributes of the shared source devices connected in the LAN including output devices such as a printer and a plotter, input devices such as a scanner and a card reader, processing devices such as an electronic computer, and peripheral devices such as an electronic microscope and a measuring device. This file also contains icon designs corresponding to these devices included in the LAN.

Each peripheral device has the substantially same control device as that of the printer described with respect to FIG. 3. In response to an inquiry sent from a workstation, the control device is designed to transfer the current operating state of the corresponding peripheral device to the workstation.

The workstation included in the LAN draws the sketch of a floor plan of a building based on the screen information file and then draws the icon of each device at the proper installed location of the floor planar sketch based on the shared source attribute file. FIG. 10 shows one example of the selected screen drawn by the method. On the screen are displayed a card reader icon 255, a scientific processing computer icon 254, and electronic microscope icons 253a, 253b.

Further, based on the operating information transferred from each device, the workstation draws the operating state of the devices. The screen shown in FIG. 10 represents that the card reader CR2 has 50 queuing cards, the scientific processing computer EC1 is usable, the electronic microscope EM1 is currently in use, and the electronic microscope EM2 is usable.

Based on the information obtained from the screen, the LAN user can know the name, location and operating state of each device included in the LAN. From the screen, the user can understand that the card reader located at the 3A room of the 3rd story of the A building contains 50 queuing cards. For searching a usable card reader, for example, the user points to "screen switch" 285 with the mouse cursor 266 for switching the screen. By searching the icon of another card reader displayed on the selected screen of another story, therefore, it is possible to know where the usable card reader is installed.

As another example, assume that the user searches the computer including a vector operating mechanism or a floating point operating mechanism which computer is good at scientific computation. The screen shown in FIG. 10 indicates that the scientific operation computer is installed at the 3B room of the 3rd story of the A building and is a usable. Then, the user points to the computer icon 254 with the icon cursor 266 so that the scientific data is transferred to the scientific operating computer EC1 through a bus line, thereby starting the operation.

And, as another example, assume that the user wants to use an electronic microscope. The screen shown in FIG. 10 indicates that the electronic microscopes are installed at rooms 3C and 3D rooms of the 3rd story of the A building and the electronic microscope located at room 3D is usable. Thus, the user can immediately use the microscope at room 3D.

The present embodiment represents the icons of all the devices stored in the shared source attribute file. It is preferable to process the information of the file based on the user's indication and display only the icon of a specific device (for example, card reader) on the screen.

Figure 11:
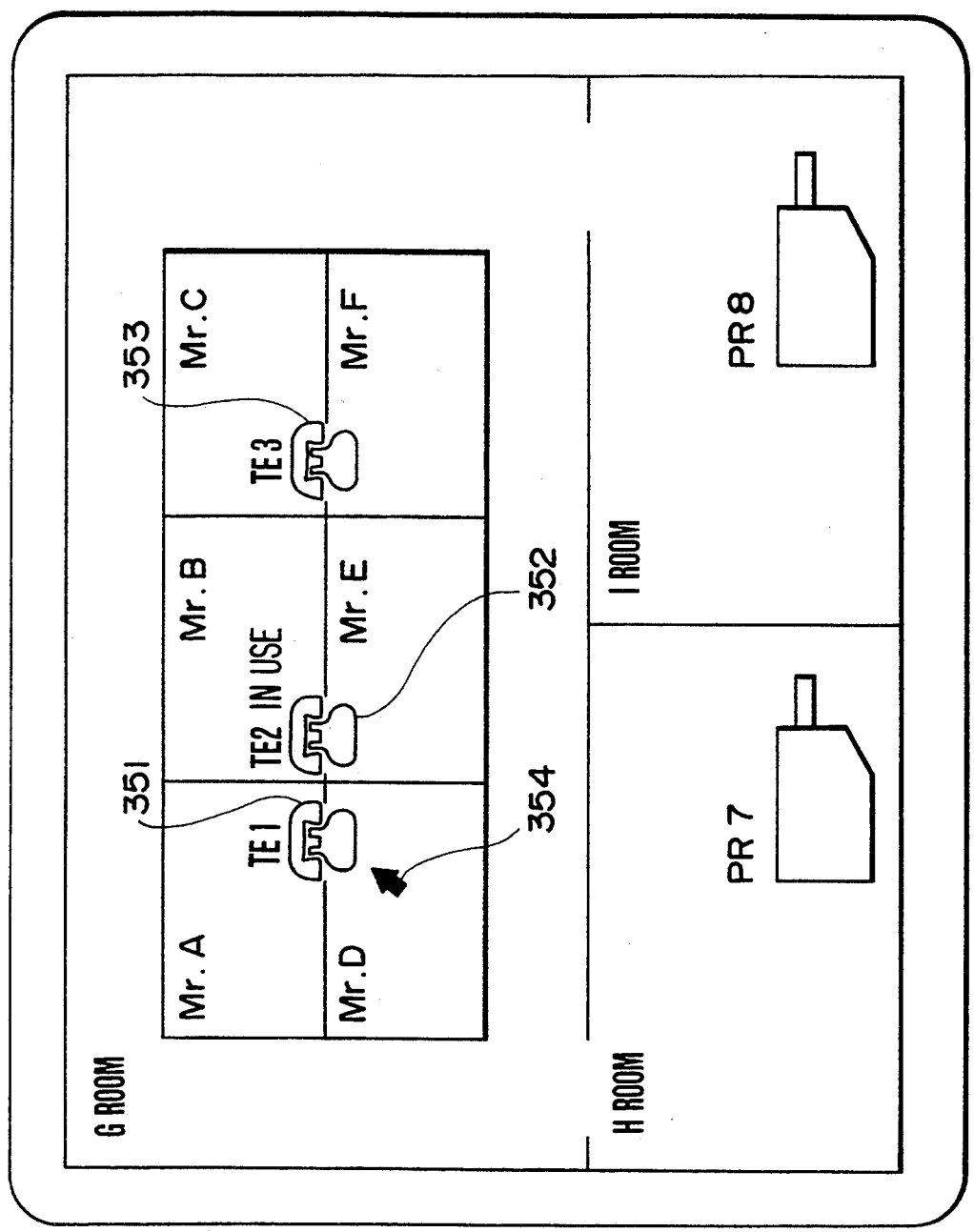
FIG. 11 is a view showing a screen on which the present invention is applied to a phone connected to the terminal.

Next, the description will be directed to the first embodiment applied to a phone with reference to FIG. 11 showing one selection screen. The workstation used in this embodiment has the same structure as that described with respect to FIG. 3 and contains the screen information file representing the same floor planar view of the building as the foregoing embodiment described with respect to FIG. 4. The screen information file contains the information about the location of each desk provided in a room and whose it is. The shared source attribute file included in the workstation has the substantially same structure as that included in the foregoing embodiment. This file contains the attribute file for peripheral devices, the installed location (attribute) of each phone, and the icon design figuring a phone.

A terminal (switcher) controlling the phone has substantially the same control device as the printer device described with respect to FIG. 3 and is connected to the bus line of the LAN so that the terminal can be controlled by the workstation. And, in response to an inquiry about the operating state of the phone sent from the workstation, the terminal informs the workstation whether or not each phone connected to the terminal is in use. Then, the dialed phone number (calling) of the workstation is connected to a phone line.

The workstation included in the LAN serves to draw the sketch of the building and the location of each desk based on the screen information file and then the phone icon at the location matched to the installed one of the phones based on the shared source attribute file. Further, the workstation identifies and displays whether or not the phone is in use on each phone icon, based on the report about the operation state of each phone sent from the terminal and displays the selection screen shown in FIG. 11 on the CRT.

If the user of the workstation wants to communicate with Mr. B, the user understands that the nearest phone to Mr. B is TE2 but it is in use. Then, the user points to the icon 351 of the second nearest phone TE1 with the icon cursor 354. By that, the workstation calls the phone Te1 through the terminal.

This embodiment has been described in a different manner from the embodiment described with respect to FIGS. 1A, 1B and 10. One workstation can switch the screen head based on the user's pointing of the cursor. For example, by hooking up the phone provided in the workstation, it is preferable to switch the screen shown in FIG. 10 to the screen shown in FIG. 11.

This embodiment makes it possible to make sure of the using state of the phone and dial the phone which is nearest to an opponent and is not in use.

Second Embodiment

The present embodiment is a result of applying the present invention to a system of managing the shared sources connected in the LAN. The first embodiment is designed to display the installed location of each shared source on the screen, while the second embodiment is designed to display the connection state and the operating state of each shared source connected in the LAN.

Figure 12:
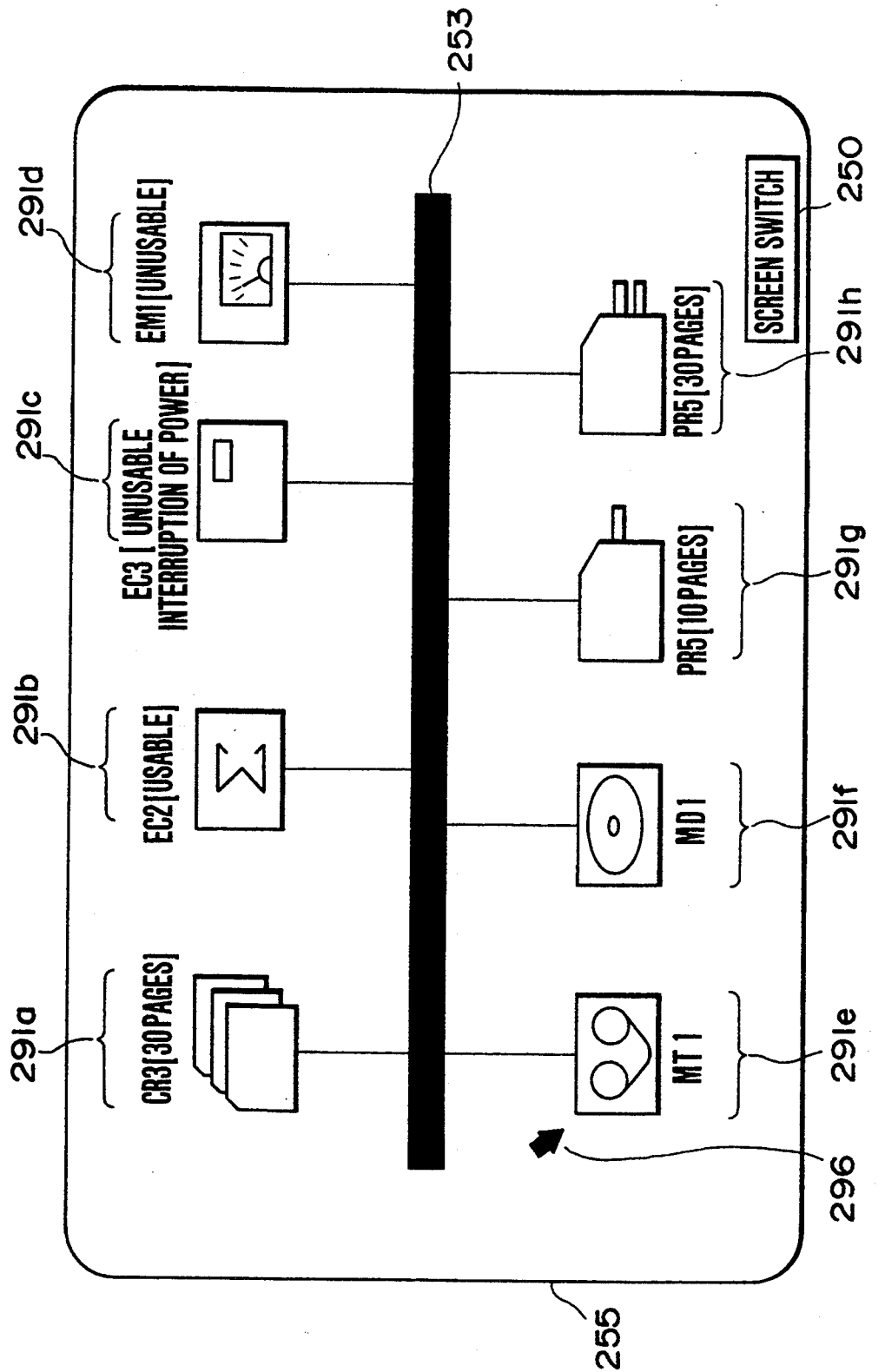
FIG. 12 is a view showing a screen on which the connecting state of shared sources is graphically displayed according to a second embodiment of the present invention.

The second embodiment serves to display on the screen the connecting state and the operating state of the shared sources including a card reader CR3, computers EC2, EC3, a measuring device EM1, a magnetic tape MT1, a magnetic disk MD1, and printers PR5, PR6 connected in an LAN 253 as shown in FIG. 12 of one selection screen.

The workstation designed according to the present embodiment has a shared source attribute file shown in FIG. 13. The shared source attribute file consists of attribute data 281a to 281h each matching to the attribute of the card reader CR3, the computers EC2, EC3, the measuring device EM1, the magnetic tape MT1, the magnetic disk MD1, and the printers PR5, PR6.

The attribute data 281a to 281h consist of a device name 282, a device type 286, a network address 283, a data number 284, relative coordinates 285a, 285b, and an icon design 287. The device name 282 indicates the name of each device (for example, the card reader). The device type 286 indicates if the computer is a scientific processing computer, a general-purpose computer, a two-stage cassette, or the like. The network address 283 is an address by which the shared source is specified in the LAN 253. The data number 284 indicates which one of the LANs to which the device is connected. The relative coordinates 285a, 285b indicate the relative locations of the connected source device. These coordinates indicate the location of each source device shown in FIG. 12 and match to the locations of the shared source icons 291a to 291h. The icon design 287 indicates icon designs of 281a to 291h.

The information processing workstation designed according to the present embodiment has the substantially the same hardware arrangement as the documentation workstation included in the foregoing embodiment. Each shared source device has the same control mechanism as the foregoing shared printer. The same information processing as the foregoing embodiment makes it possible to exchange information between the workstation and each shared source device and draw the screen. Hence, the description about the information processing workstation is not detailed.

The workstation serves to draw the connection state of each shared source by referring to the shared source attribute file shown in FIG. 13, draw the operating state of each shared source based on the information sent from the shared source, and display on the screen the connection state and the operating state of each shared source connected in the LAN as shown in FIG. 12. This screen indicates that;

(A) the card reader CR3 has 30 currently-queuing cards from the icon 291a.
(B) the computer EC2 is usable from the icon 291b,
(C) the computer EC3 is unusable because of power interruption from the icon 291c,
(D) the measuring device EM1 is in use from the icon 291d,
(E) the LAN 253 has the magnetic tape device MT1 connected thereto from the icon 291e,
(F) the LAN 253 has the magnetic disk device MT1 connected thereto from the icon 291f,
(G) the printer PR5 has a one-stage cassette and a ten-page document waiting to be printed from the icon 291g, and
(H) the printer PR6 has a two-stage cassette and a thirty-page document waiting to be printed from the icon 291h.

The user can know what shared sources are connected in the LAN 253 and the operating state of the shared sources from the screen and can operate the device by pointing to the icon design. For example, if the user needs to store the data in the storage device, he or she moves the mouse cursor 296 with the mouse for indicating the icon 291e of the magnetic tape drive, thereby causing the data to be stored in the magnetic tape device MT1.

The management system of the present embodiment is used for managing a plurality of LANs. Hence, the system is designed so that a communication line for switching information is provided between LANs and each workstation can call any one of the shared source attribute files stored in the workstations.

A workstation included in any one of the LANs makes access to the workstation storing the shared source attribute file about the LAN requiring an image display. The accessed workstation transfers the file and the data of the operating state of each device to the workstation having accessed thereto. It results in allowing the workstation included in each LAN to display the connection state and the operating state of each device connected in a desired LAN on the display unit.

For switching the displayed image into the screen about another LAN, the user should move the mouse cursor to the screen switch 255 with the mouse.

As one application of the present embodiment, more than one LAN can be displayed on one screen. Further, like the embodiment described with reference to FIGS. 1A and 1B, it is possible to store the screen information file like that shown in FIG. 4 in the network station, represent the planar view of a building on which the LAN is installed, and graphically display the connection state of the shared sources included in the LAN in an overlapping manner with the planar view. According to the display, the user can know the installed location of each device together with the connection state of the shared sources included in the LAN.

Next, another embodiment desired on the second embodiment will be described with reference to FIG. 14 illustrating one example of the selection screen. The screen shown in FIG. 12 represents all the peripheral devices are directly connected to the bus line 253 of the LAN. This embodiment displays how the source devices are connected and the peripheral devices included in one source device (node).

The shared source attribute file concerned with this embodiment has the same arrangement as the shared source attribute file described with respect to FIG. 13, except that the file contains the connection state of the devices. Further, each file is prepared for each peripheral device (for example, CPU, CRT, printer, plotter) included in one processing device (node).

The workstation serves to draw the connection state of each shared source by referring the shared source attribute file, draw the operating state by using the information about the operating state of each device sent from the corresponding device, and display the connection state of the shared sources of the LAN shown in FIG. 14 and the operating states of the shared sources on the screen. The screen represents that:

(A) the icons 451, 452, 454 respectively indicate the LAN 453 is connected to the computer EC3, the computer EC3 is connected to the magnetic tape MT2 and the magnetic disk MD2, and the computer EC3 is in use, (B) the icons 460, 456, 457, 458 respectively indicate the LAN 453 is connected to an information processing device X, the information processing device X includes CPU1, CPU3, a printer PR9 and a plotter PT1, how these devices are connected to the information processing device X, and the printer PR9 and the plotter PT1 and in use, and (C) the icon 470 indicates the LAN 464 is connected to a printer PR10 and the printer has a 30-page document waiting for being printed.

The user, thus, can know how the devices are connected and what peripheral devices are included in each node from the selection screen. Further, the user can also instruct these devices to operate by pointing to them with a mouse. For example, by pointing to the printer PR9 included in one node with the mouse cursor 464, the user causes the printer PR9 to print the document stored in another device connected to the LAN.

While particular embodiments of the present invention have been shown and described, it will be obvious to those skilled in the art that various changes and modification may be made without departing from the present invention in its broader aspects.

What is claimed is:

1. An input/output method for at least one of a plurality of I/O devices for an information network shared by a plurality of information processing units connected to said information network via one of said information processing units, said method comprising the steps of:
    displaying the connection among said I/O devices graphically and corresponding indicators representing said I/O devices with respective current operating states on a screen of said information processing unit to enable a user to locate said I/O devices and corresponding operating states of said I/O devices; and
    inputting/outputting data to a specified one of said I/O devices selected by pointing to a corresponding indicator on said screen,
    wherein the operating state of said I/O device indicates that said I/O device is currently in use.

2. An input/output method for at least one of a plurality of I/O devices for an information network shared by a plurality of information processing units connected to said information network via one of said information processing units, said method comprising the steps of:
    displaying the connection among said I/O devices graphically and corresponding indicators representing said I/O devices with respective current operating states on a screen of said information processing unit to enable a user to locate said I/O devices and corresponding operating states of said I/O devices; and
    inputting/outputting data to a specified one of said I/O devices selected by pointing to a corresponding indicator on said screen,
    wherein the operating state of said I/O device indicates that said I/O device is currently unusable.

3. An input/output method for at least one of a plurality of I/O devices for an information network shared by a plurality of information processing units connected to said information network via one of said information processing units, said method comprising the steps of:
    displaying the connection among said I/O devices graphically and corresponding indicators representing said I/O devices with respective current operating states on a screen of said information processing unit to enable a user to locate said I/O devices and corresponding operating states of said I/O devices; and
    inputting/outputting data to a specified one of said I/O devices selected by pointing to a corresponding indicator on said screen,
    wherein the operating state of said I/O device indicates the amount of data waiting to be input to or output from said I/O device.

4. An input/output method for at least one of a plurality of I/O devices for an information network shared by a plurality of information processing units connected to said information network via one of said information processing units, said method comprising the steps of:
    displaying the connection among said I/O devices graphically and corresponding indicators representing said I/O devices with respective current operating states on a screen of said information processing unit to enable a user to locate said I/O devices and corresponding operating states of said I/O devices;
    inputting/outputting data to a specified one of said I/O devices selected by pointing to a corresponding indicator on said screen; and
    indicating an input or output to said I/O device by directly pointing a cursor to the design representing said I/O device.

5. A shared source managing device including a plurality of information processing devices each having a central processing unit, a display unit, a storage unit and I/O devices shared by said plurality of information processing devices, said information processing devices and I/O devices being connected to a communication network, comprising:
    a sketch information file provided in said storage unit for storing data of a sketch of a building having said plurality of I/O devices installed therein and an I/O device attribute information file storing at least type information and installation location information for each of said I/O devices; and
    display means for displaying said sketch of said building and a design locating each of said I/O devices at the corresponding installed locations within said sketch on a screen of said display means based on said sketch information file and I/O device attribute information file.

6. The shared source managing device as claimed in claim 5, wherein said information processing devices comprise means for requesting current operating information for each of said I/O devices and means for displaying the operating state information within said design of said I/O device, and said each of said I/O devices comprise means for transmitting its respective operating state in response to said request from said information processing device.

7. The shared source managing device as claimed in claim 5, wherein a operating state of said I/O device indicates either that said I/O device is currently unusable, contains data waiting for being input or output, or is equipped with a part(s).

8. The shared source managing device as claimed in claim 5, wherein said information processing devices provide a display and pointing means for directly pointing to the design identifying said I/O device on the screen and an I/O device selecting means for indicating an I/O to the I/O device matching to the design indicated by said display and point means.

9. The shared source managing device as claimed in claim 5, wherein said sketch information file stores a respective screen for each story of said building.

10. The shared source managing device including a plurality of information processing devices each having a central processing unit, a display unit, a storage unit and I/0 devices shared by said plurality of information processing devices, said information processing devices and I/O devices being connected to a communication network, comprising:

a sketch information file provided in said storage unit for storing data of a sketch of a building having said plurality of I/O devices installed therein and an I/O device attribute information file storing at least type information and installation location information for each of said I/O devices, wherein said sketch information file stores information for each screen representing more than one story three-dimensionally as a sketch corresponding to said building; and display means for displaying said sketch of said building and a design locating each of said I/O devices at the corresponding installed locations within said sketch on a screen of said display means based on said sketch information file and I/O device attribute information file.

11. An input/output method for at least one of a plurality of I/O devices for an information network shared by a plurality of information processing units connected to said information network via one of said information processing units, said method comprising the steps of:

displaying on a screen of one of said information processing units a sketch of a building structure having said I/O devices installed therein and indicators representing said I/O devices to enable a user Go locate said I/O devices within said building structure;

selecting a designated one of said I/O devices on said screen by pointing a cursor to a corresponding indicator of said selected I/O device on said screen; and inputting/outputting data regarding operation of said selected I/O device.

12. The input/output method as claimed in claim 11 further comprising the step of identifying and displaying the kind or type of said I/O devices on said screen of said information processing devices together with said indicators comprising character strings or designs representing said I/O devices.

13. The input/output method as claimed in claim 11 further comprising the step of displaying the current operating states of said I/O devices to be used on the screens of said information processing devices together with said indicators comprising character strings or designs representing said I/O device.

14. The input/output method as claimed in claim 13 further comprising the step of identifying, and subsequently displaying on said screens, which of said I/O devices are currently in use together with said indicators comprising character strings or designs representing said I/O devices.

15. The input/output method as claimed in claim 11 further comprising the step of identifying and displaying which of said I/O devices is unusable on the screens of said information processing devices together with said indicators comprising character strings or designs representing said I/O device.

16. The input/output method as claimed in claim 11 further comprising the step of displaying the amount of data waiting for being input or output together with said indicators comprising character strings or designs representing said I/O device to be used on the screen of said information processing device.

17. A method for controlling at least one of a plurality of I/O devices and peripheral devices for an information network shared by a plurality of information processing units connected to said information network via one of said information processing units, said method comprising the steps of:

displaying on a screen of one of said information processing units a sketch of a building structure having said I/O devices and said peripheral devices installed therein and indicators representing said devices to enable a user to locate said I/O and said peripheral devices;

selecting a designated one of said I/O devices on said screen by pointing a cursor to a corresponding indicator of said selected I/O device on said screen; and controlling said selected one of said I/O devices and said peripheral devices designated by said cursor on said screen.

18. The controlling method as claimed in claim 17, wherein said peripheral device is a phone terminal, and said method further comprises the steps of displaying designs identifying phones connected to said phone terminal at respective installation locations on said sketch, identifying and displaying which of said phones is currently in use by identifying corresponding indicators, and calling a specified one of said phones by directly pointing a cursor to the corresponding design.

19. An input/output method for at least one of a plurality of I/O devices for an information network shared by a plurality of information processing units connected to said information network via one of said information processing units, said method comprising the steps of:

displaying the connection among said I/O devices graphically and corresponding indicators representing said I/O devices with respective current operating states on a screen of said information processing unit to enable a user to locate said I/O devices and corresponding operating states of said I/O devices; and inputting/outputting data to a specified one of said I/O devices selected by pointing to a corresponding indicator on said screen.

20. A method for controlling at least one of a plurality of I/O devices and peripheral devices for an information network shared by a plurality of information processing units connected to said information network via one of said information processing units, said method comprising the steps of:

displaying the connection among said I/O devices and said peripheral devices graphically and corresponding indicators representing said devices with respective current operating states on a screen of said information processing unit to enable a user to locate respective I/O devices and corresponding operating states of said I/O devices;

selecting a designated one of said I/O devices on said screen by pointing a cursor to a corresponding indicator of said selected I/O device on said screen; and controlling said selected one of said I/O devices and said corresponding peripheral devices designated by said cursor on said screen.

21. A method for controlling at least one of a plurality of I/O devices and peripheral devices for an information network shared by a plurality of information processing units connected to said information network on one of said information processing units, said method comprising the steps of:

drawing a sketch, on a screen of one of said information processing units, of a building having said I/O and peripheral devices installed therein based on drawing data stored in a drawing information file;

drawing designs representing said I/O and peripheral devices at designated installation locations throughout said building for said devices on said sketch based on data stored in a shared I/O and peripheral device attribute file;

receiving current operating state information from respective I/O and peripheral devices in said information processing unit;

displaying current operating states of said I/O and peripheral devices on said screen of said information processing unit, with said designs representing said I/O and peripheral devices based on said received current operating state information of said I/O and peripheral devices;

selecting a designated one of said I/O devices on said screen by pointing a cursor to a corresponding indicator of said selected I/O device on said screen; and controlling said selected one of said I/O and peripheral devices designated by pointing said cursor to a corresponding design on said screen.

22. An input/output method for at least one of a plurality of printers for an information network shared by a plurality of information processing units connected to said information network via one of said information processing units, said method comprising the steps of:

displaying on a screen of one of said information processing units a sketch of a building structure having said printers installed therein and indicators representing said printers to enable a user to locate said printers within said building structure;

selecting a designated one of said printers on said screen by pointing a cursor to a corresponding indicator of said selected printer on said screen; and outputting printing data regarding operation of said selected printer.

23. A method for controlling at least one of a plurality of printers for an information network shared by a plurality of information processing units connected to said information network via one of said information processing units, said method comprising the steps of:

displaying on a screen of one of said information processing units a sketch of a building structure having said printers installed therein and indicators representing said devices to enable a user to locate said printers;

selecting a designated one of said printers on said screen by pointing a cursor to a corresponding indicator of said selected printer on said screen; and controlling said selected one of said printers designated by said cursor on said screen.

24. A method for controlling at least one of a plurality of printers for an information network shared by a plurality of information processing units connected to said information network on one of said information processing units, said method comprising the steps of:

drawing a sketch, on a screen of one of said information processing units, of a building having said printers installed therein based on drawing data stored in a drawing information file;

drawing designs representing said printers at designated installation locations throughout said building for said devices on said sketch based on data stored in a shared printer attribute file;

receiving current operating state information from respective printers in said information processing unit;

displaying current operating states of said printers on said screen of said information processing unit, with said designs representing said printers based on said received current operating state information of said printers;

selecting a designated one of said printers on said screen by pointing a cursor to a corresponding indicator of said selected printer on said screen; and controlling said selected one of said printers designated by pointing said cursor to a corresponding design on said screen.

* * * * *